(12) United States Patent
MacKay et al.

(10) Patent No.: US 12,551,933 B2
(45) Date of Patent: Feb. 17, 2026

(54) MONITORING SOLVENT IN A FIBER CLEANING DEVICE

(71) Applicant: VIAVI Solutions, Inc., Chandler, AZ (US)

(72) Inventors: Gordon MacKay, Seattle, WA (US); Kevin Cassady, Monroe, WA (US); Peter Kriofske, Seattle, WA (US); William Shawn Rosenau, Everett, WA (US); Brad Basler, Everett, WA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/178,782

(22) Filed: Mar. 6, 2023

(65) Prior Publication Data

US 2023/0201886 A1 Jun. 29, 2023

Related U.S. Application Data

(63) Continuation of application No. 16/884,563, filed on May 27, 2020, now Pat. No. 11,596,983.

(51) Int. Cl.
*B08B 3/08* (2006.01)
*B08B 5/02* (2006.01)
(Continued)

(52) U.S. Cl.
CPC ............ *B08B 3/08* (2013.01); *B08B 5/02* (2013.01); *B08B 5/04* (2013.01); *B08B 13/00* (2013.01);
(Continued)

(58) Field of Classification Search
CPC .... B08B 3/08; B08B 5/02; B08B 5/04; B08B 13/00; B08B 2240/02; B08B 3/00; G01F 23/263; G02B 6/3866
See application file for complete search history.

(56) References Cited

U.S. PATENT DOCUMENTS 4,003,255 A 1/1977 Spencer
6,159,345 A 12/2000 Donnelly et al.
(Continued)

FOREIGN PATENT DOCUMENTS

CN 2353459 Y 12/1999
CN 101208258 A 6/2008
(Continued)

OTHER PUBLICATIONS

Extended European Search Report for Application No. 21175195.3, mailed on Nov. 2, 2021, 9 pages.
(Continued)

*Primary Examiner* — Erin F Bergner
(74) *Attorney, Agent, or Firm* — Harrity & Harrity, LLP

(57) ABSTRACT

A device for cleaning an end face of an optical fiber may apply a vacuum to a solvent tank, where the device includes a vacuum generator to apply the vacuum and the solvent tank. The device may receive, from a solvent reservoir and in response to applying the vacuum, solvent with the solvent tank. Additionally, or alternatively, a device for cleaning an end face of an optical fiber may apply a pressure to a solvent reservoir, where the device includes a pressure port to apply the pressure and a solvent tank. The device may receive, from the solvent reservoir and in response to applying the pressure, solvent with the solvent tank.

20 Claims, 6 Drawing Sheets

(51) Int. Cl.
*B08B 5/04* (2006.01)
*B08B 13/00* (2006.01)
*G01F 23/263* (2022.01)

(52) U.S. Cl.
CPC ........ *G01F 23/263* (2013.01); *B08B 2240/02* (2013.01)

(56) References Cited

U.S. PATENT DOCUMENTS

| | | | |
|---|---|---|---|
| 6,629,627 | B1 | 10/2003 | Siegele et al. |
| 6,676,763 | B2 | 1/2004 | Johnson, III et al. |
| 7,334,708 | B2 | 2/2008 | Xu et al. |
| 11,596,983 | B2 | 3/2023 | Mackay et al. |
| 2003/0005942 | A1* | 1/2003 | Johnson, III .............. B08B 3/12 134/1 |
| 2004/0178804 | A1 | 9/2004 | Allen et al. |
| 2009/0223539 | A1 | 9/2009 | Gibbel |
| 2015/0013646 | A1* | 1/2015 | Qi ........................... G01F 23/74 73/304 C |
| 2016/0377810 | A1 | 12/2016 | Lee et al. |

FOREIGN PATENT DOCUMENTS

| | | |
|---|---|---|
| CN | 203253667 U | 10/2013 |
| CN | 104209347 A | 12/2014 |
| CN | 104668223 A | 6/2015 |
| CN | 209592184 U | 11/2019 |
| CN | 210020768 U | 2/2020 |
| GB | 2286048 A | 8/1995 |
| JP | 2004330035 A | 11/2004 |

OTHER PUBLICATIONS

Extended European Search Report for Application No. EP20230179629, mailed on Sep. 22, 2023, 10 Pages.

* cited by examiner

MONITORING SOLVENT IN A FIBER CLEANING DEVICE

RELATED APPLICATION

This application is a continuation of U.S. patent application Ser. No. 16/884,563, filed May 27, 2020 (now U.S. Pat. No. 11,596,983), which is incorporated herein by reference in its entirety.

BACKGROUND

Contaminants, such as dust, dirt, oil, and/or the like, on an end face of an optical fiber connector can negatively impact network performance by increasing signal loss and damaging the optical fiber. As bandwidth demands rise and signal loss budgets become tighter, the ability to inspect and clean end faces of optical fibers before connecting has become critical.

SUMMARY

According to some implementations, a method may include applying, by a device for cleaning an end face of an optical fiber, a vacuum to a solvent tank, wherein the device includes a vacuum generator to apply the vacuum, and the solvent tank; and receiving, by the device, from a solvent reservoir, and in response to applying the vacuum, solvent with the solvent tank.

According to some implementations, a method may include applying, by a device for cleaning an end face of an optical fiber, a pressure to a solvent reservoir, wherein the device includes: a pressure port to apply the pressure, and a solvent tank; and receiving, by the device, from the solvent reservoir, and in response to applying the pressure, solvent with the solvent tank.

According to some implementations, a device for cleaning an end face of an optical fiber may include a vacuum generator to generate a vacuum for cleaning the end face; a pressure port to provide pressurized air for cleaning the end face; a solvent tank to store solvent for cleaning the end face; one or more processors configured to: at least one of: apply, using the vacuum generator, a vacuum to the solvent tank, wherein, in response to applying the vacuum, the solvent tank receives solvent from a solvent reservoir, or apply, using the pressure port, a pressure to the solvent reservoir, wherein, in response to applying the pressure, the solvent tank receives solvent from the solvent reservoir.

DETAILED DESCRIPTION

Figure 1:
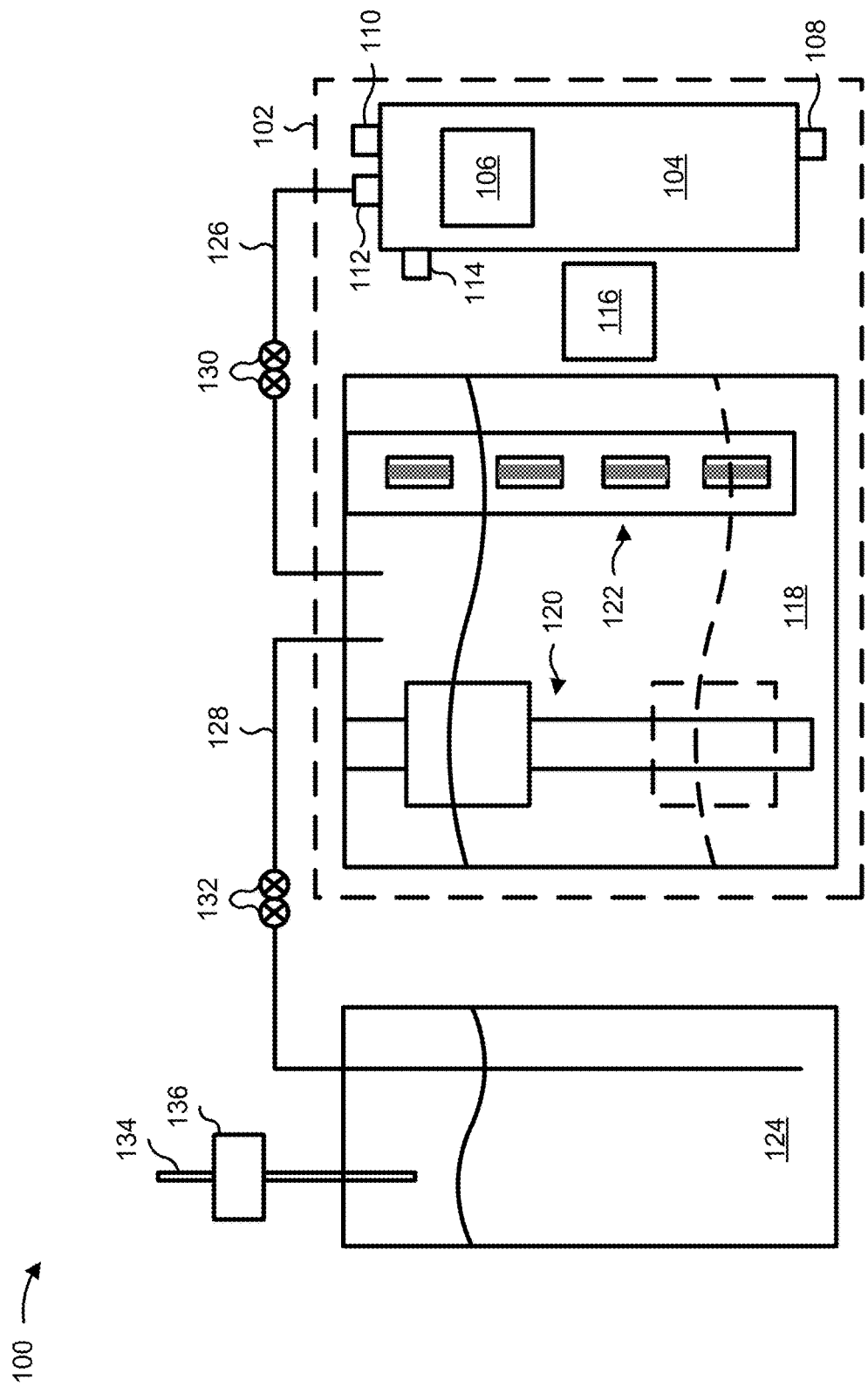
FIG. 1 is a diagram of an example implementation of a process for filling a solvent tank of a fiber cleaning device with solvent from a solvent reservoir described herein.

The following detailed description of example implementations refers to the accompanying drawings. The same reference numbers in different drawings may identify the same or similar elements.

Fiber cleaning devices may include a bench-top assembly and a handset connected to the bench-top assembly (e.g., via an umbilical cord and/or the like). The bench-top assembly may include a solvent tank for holding solvent used to clean end faces of optical fibers, a pneumatic circuit, a controller, a display, and one or more user-input mechanisms (e.g., buttons, knobs, switches, and/or the like). The pneumatic circuit may be connected via a pressure supply port to a user-provided compressed air supply. The pneumatic circuit may include a vacuum generator that uses air flow from the compressed air supply to generate a vacuum at a vacuum port. The pneumatic circuit may also use the compressed air flow to provide a pressurized air flow at a pressure output port. The handset may receive, via the umbilical cord, vacuum from the vacuum port, pressurized air flow from the pressure port, and solvent from the solvent tank. A user may manipulate the handset to use the vacuum, pressurized air, and solvent to clean end faces of optical fibers.

When the device is low on solvent, a user may connect hoses to an intake and an outtake on a refill port assembly on the bench-top assembly, may connect the hoses to a bottle of solvent, and may elevate the bottle to gravity feed solvent into the solvent tank. However, gravity feeding the solvent is slow, should be monitored to prevent overfilling the solvent tank, and risks contamination of the solvent tank.

Some implementations described herein provide a method for filling and/or refilling a solvent tank and monitoring solvent in a device for cleaning an end face of an optical fiber. In some implementations, the method may include applying, with the device, a vacuum to a solvent tank and receiving, from a solvent reservoir and in response to applying the vacuum, solvent with the solvent tank. For example, a hose may connect a vacuum port of the device to the solvent tank, and another hose may connect the solvent reservoir to the solvent tank. In some implementations, applying the vacuum to the solvent tank (e.g., through the hose and with the vacuum port) generates a suction to pull solvent from the solvent reservoir (e.g., through the other hose) to the solvent tank.

In some implementations, the method may include applying, with the device, a pressure to the solvent reservoir and receiving, from the solvent reservoir and in response to applying the pressure, solvent in the solvent tank. For example, a first hose may connect an exhaust port of the device to the solvent tank, a second hose may connect the solvent reservoir to the solvent tank, and a third hose may connect a pressure port of the device to the solvent reservoir. In some implementations, applying the pressure to the solvent reservoir generates a positive pressure to push solvent from the solvent reservoir to the solvent tank.

In some implementations, the method may include applying the vacuum to the solvent tank and applying the pressure to the solvent reservoir. By applying the vacuum to the solvent tank and/or the pressure to the solvent reservoir, the method and/or the device may fill the solvent tank in less time than when using a gravity feed. Additionally, or alternatively, the method and/or the device may fill and/or refill the solvent tank from larger solvent reservoirs than may be possible for a manual gravity feed process. For example, the solvent reservoir may be a gallon-size container, a barrel (e.g., a fifty-gallon barrel), and/or the like, rather than a 225-milliliter container. Furthermore, filling and/or refilling the solvent tank from larger solvent reservoirs may conserve financial resources due to a reduced relative cost of the larger solvent reservoirs as compared to smaller solvent reservoirs.

Additionally, or alternatively, the method may include monitoring a solvent level in the solvent tank during the fill process. For example, the method may include determining, based on a signal from a sensor of the device, the solvent level in the solvent tank, and performing, based on the solvent level, one or more actions, such as stopping applying the vacuum, displaying the solvent level, providing a visual alert and/or an audible alert, and/or the like. By monitoring the solvent level in the solvent tank during the fill process, the method and/or the device may prevent overfilling. Additionally, or alternatively, the method for filling and/or refilling the solvent tank may be an automated process, rather than a manual process.

In some implementations, the method may include filtering air entering the solvent reservoir in response to the vacuum applied to the solvent tank. Additionally, or alternatively, the method may include connecting portions of hoses using fittings including valves to provide a closed circuit for solvent and/or air flow. By filtering air entering the solvent reservoir and/or providing a closed circuit for solvent and/or air flow, the method and/or the device may prevent contaminants from entering the solvent and/or the device.

FIG. 1 is a diagram of an example implementation 100 of a process (e.g., a method) for filling a solvent tank 118 of a fiber cleaning device 102 with solvent from a solvent reservoir 124 described herein. As shown in FIG. 1, the fiber cleaning device 102 may include a pneumatic circuit 104 (e.g., a pneumatic assembly), a vacuum generator 106, a pressure supply port 108, a pressure output port 110, a vacuum port 112, an exhaust port 114, a controller 116, the solvent tank 118, a float sensor 120, and a capacitive sensor 122. In some implementations, the solvent reservoir 124 may be a container (e.g., a bottle, a barrel, and/or the like) holding solvent (e.g., a fiber-cleaning solvent, an engineered fluid (e.g., NOVEC 72DA engineered fluid from 3M), and/or the like) for use by the fiber cleaning device 102.

In some implementations, and as shown in FIG. 1, the pneumatic circuit 104 may include the vacuum generator 106, the pressure supply port 108, the pressure output port 110, the vacuum port 112, and the exhaust port 114. The fiber cleaning device 102 and/or the pneumatic circuit 104 may receive air flow from a compressed air supply through the pressure supply port 108 and use the air flow to provide a pressurized air flow at the pressure output port 110, a vacuum at the vacuum port 112 (e.g., via the vacuum generator 106), and output exhaust (e.g., from the vacuum generator 106) at the exhaust port 114. For example, the vacuum generator 106 may be a venturi vacuum. Additionally, or alternatively, the fiber cleaning device 102 and/or the pneumatic circuit 104 may provide a vacuum at the vacuum port 112 using a micro compressor (e.g., when the fiber cleaning device 102 is portable and/or the like).

In some implementations, during an optical fiber end face cleaning process, a user may operate the fiber cleaning device 102 to use pressurized air flow from the pressure output port 110, vacuum from the vacuum port 112, and/or solvent from the solvent tank 118 to clean an end face of an optical fiber. For example, the fiber cleaning device 102 may include a handset connected, via an umbilical cord, to the pressure output port 110, the vacuum port 112, and/or the solvent tank 118, and the user may manipulate the handset to provide pressurized air flow, vacuum, and/or solvent to the end face of the optical fiber. In some implementations, the controller 116 may, based on user manipulation of the handset and/or instructions stored in memory of the controller, control the handset and/or the pneumatic circuit 104 to provide pressurized air, vacuum, and/or solvent (e.g., in a pattern and/or series of steps and/or the like).

In some implementations, during a solvent tank 118 filling process, the vacuum generator 106 may apply a vacuum, through the vacuum port 112 and a first hose 126, to the solvent tank 118. For example, the fiber cleaning device 102 may receive air flow from a compressed air supply through the pressure supply port 108, and the vacuum generator 106 may use the air flow to generate a vacuum at the vacuum port 112. As shown in FIG. 1, an end of the first hose 126 may be in fluid communication with (e.g., connected to) the vacuum port 112, and another end of the first hose 126 may be in fluid communication with (e.g., connected to) the solvent tank 118. As also shown in FIG. 1, the first hose 126 may be in fluid communication with an upper portion of the solvent tank 118 in which there is no solvent, such that when vacuum is applied through the first hose 126 air and/or gas is removed from the solvent tank 118.

In some implementations, the vacuum port 112 may be in fluid communication with a handset. For example, the fiber cleaning device 102 may include the handset and the umbilical cord may provide fluid communication between the vacuum port 112 and the handset. In some implementations, during a solvent tank 118 filling process, the first hose 126 may be connected to the handset, and the vacuum generator 106 may apply the vacuum, to the solvent tank 118, through the vacuum port 112, the handset, and the first hose 126.

As shown in FIG. 1, a second hose 128 may provide fluid communication between the solvent reservoir 124 and the solvent tank 118. For example, an end of the second hose 128 may be in fluid communication with (e.g., connected to) the solvent tank 118, and another end of the second hose 128 may be in fluid communication with (e.g., connected to) the solvent reservoir 124. As shown in FIG. 1, the second hose 128 may be in fluid communication with a lower portion of the solvent reservoir 124 in which there is solvent, such that when vacuum and/or suction is applied through the second hose 128 solvent is removed from the solvent reservoir 124.

In some implementations, applying the vacuum to the solvent tank 118 pulls air and/or gas out of the solvent tank 118. By pulling air and/or gas out of the solvent tank 118, pressure within the solvent tank 118 may decrease, thereby generating a suction (e.g., through the second hose 128) to pull solvent from the solvent reservoir 124 to the solvent tank 118. In this way, the fiber cleaning device 102 may use the vacuum generator 106 to apply vacuum to the solvent tank 118 to draw solvent from the solvent reservoir 124 to the solvent tank 118. By applying the vacuum to the solvent tank 118, the fiber cleaning device 102 may fill the solvent tank 118 in less time than when using a gravity feed. Additionally, or alternatively, the method and/or the device may fill and/or refill the solvent tank 118 from larger solvent reservoirs than may be possible for a manual gravity feed process. For example, the solvent reservoir 124 may be a gallon-size container, a barrel (e.g., a fifty-gallon barrel), and/or the like, rather than a 225-milliliter container. Furthermore, filling and/or refilling the solvent tank 118 from larger solvent reservoirs may conserve financial resources due to a reduced relative cost of the larger solvent reservoirs as compared to smaller solvent reservoirs. Additionally, or alternatively, the method and/or the device for filling and/or refilling the solvent tank 118 without a gravity feed may be considered, under laws and/or regulations, adaptive tooling for individuals with disabilities.

In some implementations, the fiber cleaning device 102 may include a sensor to provide a signal to the controller 116 regarding contents of the solvent tank 118. In some implementations, the sensor may sense a solvent level in the solvent tank 118 and generate a signal based on the solvent level. For example, and as shown in FIG. 1, the fiber cleaning device 102 may include, in the solvent tank 118, the float sensor 120 and the capacitive sensor 122.

In some implementations, the float sensor 120 may sense a level of liquid in the solvent tank 118 and may generate a liquid-level signal based on the level of liquid. The float sensor 120 may include a float portion that floats in the liquid in the solvent tank 118 and, therefore, rises and falls with the liquid in the solvent tank 118. For example, when the liquid level in the solvent tank 118 is high, the float portion of the float sensor 120 may be in a position shown in solid lines in FIG. 1, and when the liquid level in the solvent tank 118 is low, the float portion of the float sensor 120 may be in a position shown in dashed lines in FIG. 1. Based on a position of the float portion, the float sensor 120 may generate the liquid-level signal. For example, the float sensor 120 may include internal switches at different solvent levels which may be toggled by the float portion, and the liquid-level signal may be based on an internal switch being toggled by the float portion.

In some implementations, the capacitive sensor 122 may sense a capacitance of fluid (e.g., liquids and/or gases) in the solvent tank 118 and may generate a capacitance signal based on the capacitance of the fluid. In some implementations, the fiber cleaning device 102 and/or the controller 116 may be configured, based on known capacitances of air and solvent, to determine a solvent level based on the capacitance signal. The capacitive sensor 122 may include two elements spaced apart from each other and may generate an electric field between the two elements. The capacitive sensor 122 may detect changes to the electric field caused by changes in the capacitance of fluid between the two elements. The capacitance of fluid may change when an amount and/or a type of fluid changes. In this way, the capacitive sensor 122 may detect changes in an amount and/or a type of fluid in the solvent tank 118, and, based on the detected changes, change the capacitance signal. In some implementations, the capacitive sensor 122 may be similar to a capacitive sensor described in further detail below with respect to FIG. 3.

In some implementations, the fiber cleaning device 102 may perform (e.g., with the controller 116, the pneumatic circuit 104, and/or the like) one or more actions based on the liquid-level signal and/or the capacitance signal. For example, the fiber cleaning device 102 may, based on the liquid-level signal and/or the capacitance signal, display (e.g., on a display of the fiber cleaning device 102) a solvent level, provide a visual alert (e.g., illuminate a light, a panel, a series of lights, and/or the like), provide an audible alert (e.g., via a speaker and/or the like), and/or the like. In some implementations, the one or more actions may provide the user with information, confirm that the fiber cleaning device 102 is operating properly, notify the user that the fiber cleaning device 102 is not operating properly, notify the user that the solvent tank 118 needs to be refilled, notify the user that the solvent tank 118 is contaminated, and/or the like.

In some implementations, during a solvent tank 118 filling process, the fiber cleaning device 102 may perform, based on the liquid-level signal and/or the capacitance signal, one or more actions to change and/or stop the filling process. For example, the fiber cleaning device 102 (e.g., using the controller 116) may determine, based on the liquid-level signal and/or the capacitance signal, a solvent level in the solvent tank 118 and may perform, based on the solvent level, one or more actions, such as: decrease a strength of the vacuum applied to the solvent tank 118, stop applying the vacuum, display the solvent level, provide a visual alert, provide an audible alert, and/or the like.

In some implementations, the fiber cleaning device 102 may determine, based on the liquid-level signal and/or the capacitance signal, that the solvent level in the solvent tank 118 satisfies an upper threshold, and stop, based on the solvent level in the solvent tank 118 satisfying the upper threshold, applying the vacuum. For example, the upper threshold may correspond to solvent levels that maintain, in the solvent tank 118 and above the solvent, an air gap required for the solvent tank 118 and/or the fiber cleaning device 102 to operate properly (e.g., to permit the fiber cleaning device 102 to pressurize the solvent tank 118 and/or the like). By monitoring the solvent level in the solvent tank 118 during the fill process, the fiber cleaning device 102 may prevent overfilling.

In some implementations, during a solvent tank 118 filling process, the fiber cleaning device 102 may determine, based on the liquid-level signal and/or the capacitance signal, a rate of change of the solvent level in the solvent tank 118, and perform, based on the rate of change, one or more actions. Additionally, or alternatively, the fiber cleaning device 102 may determine that the rate of change of the solvent level in the solvent tank 118 satisfies a threshold and perform, based on the rate of change satisfying the threshold, one or more actions. For example, the fiber cleaning device 102 may determine that the rate of change of the solvent level in the solvent tank 118 is decreasing or zero and may stop applying the vacuum. In some implementations, the rate of change of the solvent level decreasing or being zero may indicate the solvent reservoir 124 is empty, a problem with the first hose 126 and/or the second hose 128 (e.g., a clog, a disconnection, and/or the like), a malfunction in the pneumatic circuit 104 (e.g., a disconnected air supply, a clogged air filter, and/or the like), and/or the like. By monitoring the rate of change of the solvent level in the solvent tank 118 during the fill process, the fiber cleaning device 102 may prevent damage to the solvent reservoir 124 (e.g., caused by continuing to apply a vacuum), prevent damage to the fiber cleaning device 102, prevent wasted time by providing a user with information (e.g., that the solvent reservoir 124 is empty, that the fiber cleaning device 102 needs maintenance, and/or the like), and/or the like.

In some implementations, and as shown in FIG. 1, a mechanical fitting having two valves 130 may join portions of the first hose 126, and another mechanical fitting having two valves 132 may join portions of the second hose 128. In some implementations, the mechanical fittings may include a male connector having a first valve of the valves 130, 132, and a female connector having a second valve of the valves 130, 132. For example, the mechanical fitting may be a quick connect fitting, a push fitting, and/or the like. The two valves of the mechanical fitting may prevent air and/or other contaminants from entering the first hose 126 and/or the second hose 128 when a user joins the portions of the first hose 126 and/or joins the portions of the second hose 128.

Additionally, or alternatively, and as shown in FIG. 1, a tube 134 and an air filter 136 may be used to filter air entering the solvent reservoir 124 during the filling process. For example, as the vacuum is applied to the solvent tank 118 and solvent is pulled from the solvent reservoir 124 into the solvent tank 118, the tube 134 and the air filter 136 may filter air entering the solvent reservoir 124 (e.g., through a ventilation hole in a cap on the solvent reservoir 124, a pressure-release valve, and/or the like) due to the solvent being pulled from the solvent reservoir 124 into the solvent tank 118. By filtering air entering the solvent reservoir 124, the tube 134 and the air filter 136 may prevent contaminants from entering the solvent and/or the fiber cleaning device 102.

As described above, the capacitive sensor 122 may detect changes in an amount and/or a type of fluid in the solvent tank 118, and, based on the detected changes, change the capacitance signal. In some implementations, the controller 116 may, based on the capacitance signal, determine a rate of change of capacitance of fluid in the solvent tank 118. Additionally, or alternatively, the controller 116 may perform, based on the capacitance signal and/or the rate of change of capacitance of fluid in the solvent tank 118, one or more actions, such as stopping the vacuum, displaying information regarding fluid in the solvent tank 118, providing a visual alert, providing an audible alert, and/or the like.

For example, the fiber cleaning device 102 and/or the controller 116 may be configured to determine, based on the capacitance signal and known capacitances and/or dielectric constants of air, solvent, water, isopropyl alcohol, and/or other liquids, whether the solvent tank 118 is contaminated (e.g., by water, isopropyl alcohol, other liquids, and/or the like). As another example, the fiber cleaning device 102 and/or the controller 116 may be configured to determine, based on the capacitance signal from the capacitive sensor 122, the fluid-level signal from the float sensor 120, and a known correspondence between the capacitance signal and the fluid-level signal when only solvent is in the solvent tank 118, whether the solvent tank 118 is contaminated. The fiber cleaning device 102 and/or the controller 116 may further be configured to perform, based on determining that the solvent tank 118 is contaminated, one or more actions, such as stopping the vacuum, displaying information indicating that the solvent tank 118 is contaminated, providing a visual alert, providing an audible alert, and/or the like. By detecting (e.g., with the capacitive sensor 122) changes in an amount and/or a type of fluid in the solvent tank 118, the fiber cleaning device 102 may prevent damage to the fiber cleaning device 102 by contaminants.

In some implementations, the fiber cleaning device 102 may include a bench-top assembly, where the bench-top assembly includes the pneumatic circuit 104, the controller 116, the solvent tank 118, a display, and one or more user-input mechanisms (e.g., buttons, knobs, switches, and/or the like). In some implementations, the bench-top assembly may include attachment mechanisms (e.g., threaded bolt holes and/or the like) such that the fiber cleaning device 102 may be mounted to a movable cart (e.g., with wheels and/or the like) on which is mounted a compressed air supply. Additionally, or alternatively, the fiber cleaning device 102 may include a battery (e.g., an internal battery, a rechargeable battery, and/or the like), such that, when mounted to a movable core with a compressed air supply, the fiber cleaning device 102 may be operated without a bench air supply and/or a bench power supply.

In some implementations, the fiber cleaning device 102 may include a bottom plate of a housing, where the solvent tank 118 is positioned within the housing on the bottom plate. In some implementations, the bottom plate may include a drain system to drain solvent that escapes from the solvent tank 118 to the exterior of the housing. For example, the drain system may include a channel, in the bottom plate, surrounding the solvent tank 118 and one or more holes connected to the channel for draining solvent from the channel to an exterior of the housing. Additionally, or alternatively, the fiber cleaning device 102 and/or the controller 116 may be configured to drain the solvent tank 118 by applying pressure to the solvent tank 118 (e.g., by turning on a solenoid and/or the like), such that solvent flows out of the solvent tank 118 and drains through the drain systems.

In some implementations, the fiber cleaning device 102 may include a solvent delivery system that provides solvent from the solvent tank 118 through the umbilical cord to the handset for cleaning an end face of an optical fiber. During a cleaning operation, the fiber cleaning device 102 may be configured to provide, with the solvent delivery system, multiple shots of solvent from the solvent tank 118 to the handset, where each shot includes a known volume of solvent. The fiber cleaning device 102 may be configured to determine, based on the capacitance signal from the capacitive sensor 122, an expected decrease in solvent level in the solvent tank 118 for each shot. The fiber cleaning device 102 may further be configured to determine, based on the capacitance signal before and after a shot, whether a measured decrease in solvent level for the shot corresponds to the expected decrease. In some implementations, the fiber cleaning device 102 may be configured to perform, based on the measured decrease in solvent level for the shot not corresponding to the expected decrease, one or more actions, such as stopping the cleaning operation, displaying information to a user, providing a visual alert and/or an audible alert, and/or the like. In this way, the fiber cleaning device 102 may be configured to detect, based on the capacitance signal from the capacitive sensor 122, a malfunction in the solvent delivery system (e.g., a clogged port, a solenoid failure, a kink in a pipe, and/or the like).

In some implementations, the fiber cleaning device 102 may be configured to permit a user to select standard cleaning profiles, custom cleaning profiles, and/or the like, where the cleaning profiles configure the fiber cleaning device 102 to perform a series of cleaning steps (e.g., providing pressurized air, providing solvent, applying a vacuum, and/or the like) and parameters for the cleaning steps (e.g., pressure and/or duration for providing pressurized air, amount and/or duration for providing solvent, pressure and/or duration for applying vacuum, and/or the like). Additionally, or alternatively, the fiber cleaning device 102 may be configured to permit a user to create and/or edit cleaning profiles (e.g., by manipulating input mechanisms on the fiber cleaning device 102, by loading, onto the fiber cleaning device 102, cleaning profiles created and/or edited on another device, and/or the like). In this way, the fiber cleaning device 102 may permit a user to customize the cleaning profiles, the cleaning steps, and/or the parameters for the cleaning steps based on an intended application (e.g., simplex, multi-fiber push on (MPO), and/or the like).

As indicated above, FIG. 1 is provided merely as an example. Other examples are contemplated and may differ from what is described with regard to FIG. 1.

Figure 2:
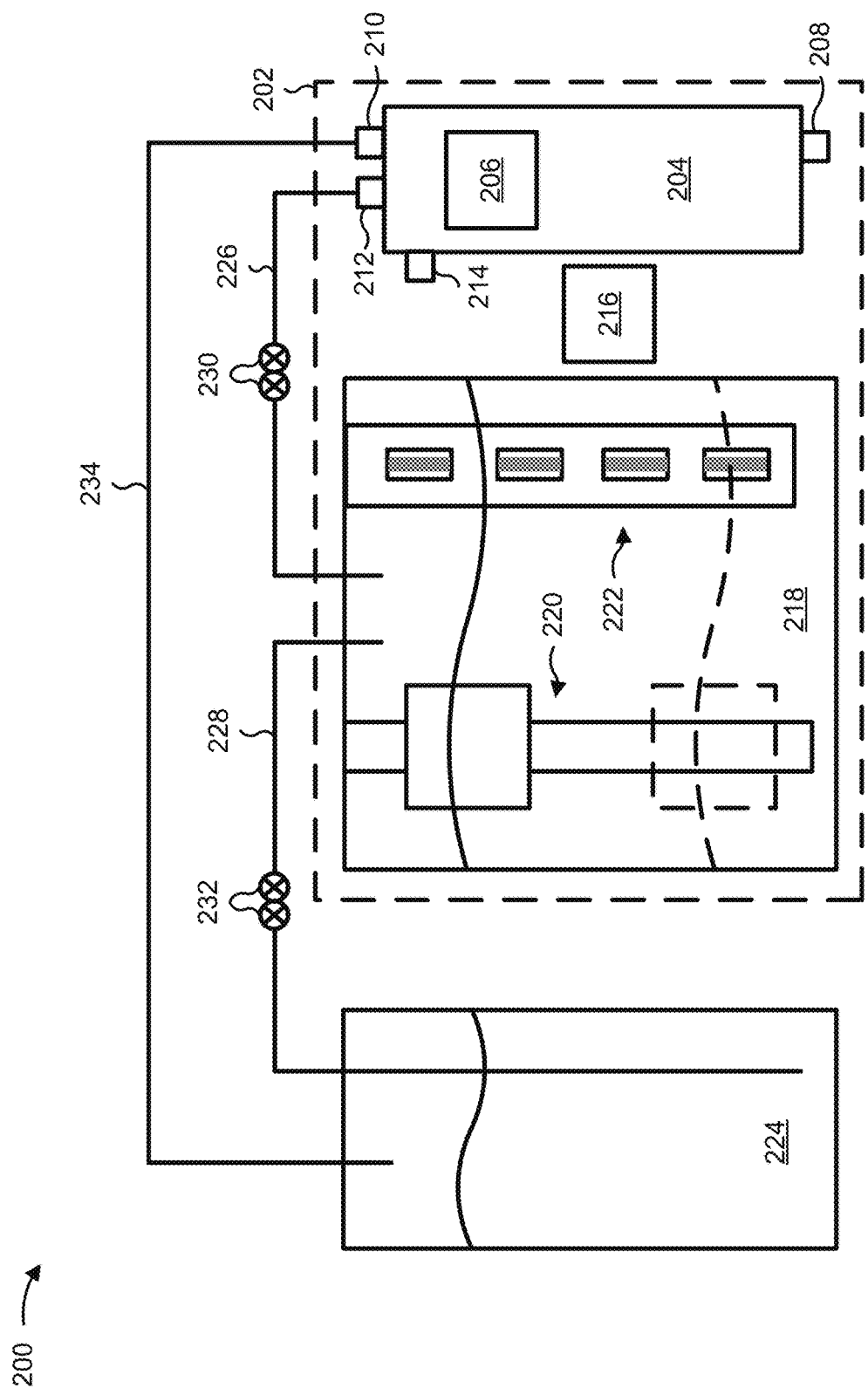
FIG. 2 is a diagram of an example implementation of a process for filling a solvent tank of a fiber cleaning device with solvent from a solvent reservoir described herein.

FIG. 2 is a diagram of an example implementation 200 of a process (e.g., a method) for filling a solvent tank 218 of a fiber cleaning device 202 with solvent from a solvent reservoir 224 described herein. As shown in FIG. 2, the fiber cleaning device 202 may include a pneumatic circuit 204, a vacuum generator 206, a pressure supply port 208, a pressure output port 210, a vacuum port 212, an exhaust port 214, a controller 216, the solvent tank 218, a float sensor 220, and a capacitive sensor 222.

In some implementations, the fiber cleaning device 202 and the solvent reservoir 224 may, respectively, be similar to the fiber cleaning device 102 and the solvent reservoir 124 described herein with respect to FIG. 1. Additionally, or alternatively, a first hose 226, a second hose 228, valves 230, and valves 232 may, respectively, be similar to the first hose 126, the second hose 128, the valves 130, and the valves 232 described herein with respect to FIG. 1.

As shown in FIG. 2, a third hose 234 may provide fluid communication between the pressure output port 210 and the solvent reservoir 224. For example, an end of the third hose 234 may be in fluid communication with (e.g., connected to) the pressure output port 210, and another end of the third hose 234 may be in fluid communication with (e.g., connected to) the solvent reservoir 224. In some implementations, and as shown in FIG. 2, the third hose 234 may be in fluid communication with an upper portion of the solvent reservoir 224 in which there is no solvent.

In some implementations, during a solvent tank 218 filling process, the pneumatic circuit 204 may apply a pressure, through the pressure output port 210 and the third hose 234, to the solvent reservoir 224. For example, the fiber cleaning device 202 may receive air flow from a compressed air supply through the pressure supply port 208, and the pneumatic circuit 204 may use the air flow to generate a pressurized air flow at the pressure output port 210.

In some implementations, the pressure output port 210 may be in fluid communication with a handset. For example, the fiber cleaning device 202 may include the handset, and the umbilical cord may provide fluid communication between the pressure output port 210 and the handset. In some implementations, during a solvent tank 218 filling process, the third hose 234 may be connected to the handset, and the pneumatic circuit 204 may apply pressure, to the solvent reservoir 224, through the pressure output port 210, the handset, and the third hose 234.

In some implementations, applying the pressure to the solvent reservoir 224 may increase pressure within the solvent reservoir 224 and push solvent out of the solvent reservoir 224, through the second hose 228, and into the solvent tank 218. In this way, the fiber cleaning device 202 may use the pressure output port 210 to apply pressure to the solvent reservoir 224 to push solvent from the solvent reservoir 224 to the solvent tank 218. By applying the pressure to the solvent reservoir 224, the fiber cleaning device 202 may fill the solvent tank 218 in less time than when using a gravity feed. Additionally, or alternatively, by applying the pressure to the solvent reservoir 224 through the third hose 234 and using the first hose 226 and the second hose 228, the fiber cleaning device 202 may fill the solvent tank 218 using a closed circuit for fluid flow, which may reduce the risk of contamination (e.g., by air, open atmosphere, and/or the like) of the fiber cleaning device 102, the solvent reservoir 224, and/or the like.

In some implementations, during a solvent tank 218 filling process, a pressure release valve may be used (e.g., on the solvent reservoir 224) to prevent the applied pressure from exceeding a threshold at which the solvent reservoir 224 may fail (e.g., shatter, crack, and/or the like). For example, a top may be placed on the solvent reservoir 224, and the top may include the pressure release valve (e.g., a safety pop mechanism and/or the like).

In some implementations, pushing the solvent into the solvent tank 218 may push air and/or gas through the first hose 226 to the vacuum port 212. In some implementations, the pneumatic circuit 204 and/or the vacuum generator 206 may be configured to release air and/or gas entering the vacuum port 212 from the first hose 226 through the exhaust port 214. Additionally, or alternatively, the fiber cleaning device 202 may be configured to, while applying pressure to the solvent reservoir 224 at the pressure output port 210, apply vacuum to the solvent tank 218 (e.g., via the first hose 226) at the vacuum port 212 (e.g., in a manner similar to that described herein with respect to FIG. 1).

In some implementations, the fiber cleaning device 202 may perform (e.g., with the controller 216, the pneumatic circuit 204, and/or the like) one or more actions based on a liquid-level signal from the float sensor 220, a capacitance signal from the capacitive sensor 222, a rate of change of the liquid-level signal, and/or a rate of change of the capacitance signal in a manner similar to that described herein with respect to FIG. 1. In some implementations, rather than, or in addition to, decreasing a strength of the vacuum applied or stopping applying the vacuum, the fiber cleaning device 202 may decrease pressure applied to the solvent reservoir 224, stop applying the pressure, and/or the like.

As indicated above, FIG. 2 is provided merely as an example. Other examples are contemplated and may differ from what is described with regard to FIG. 2.

Figure 3B:
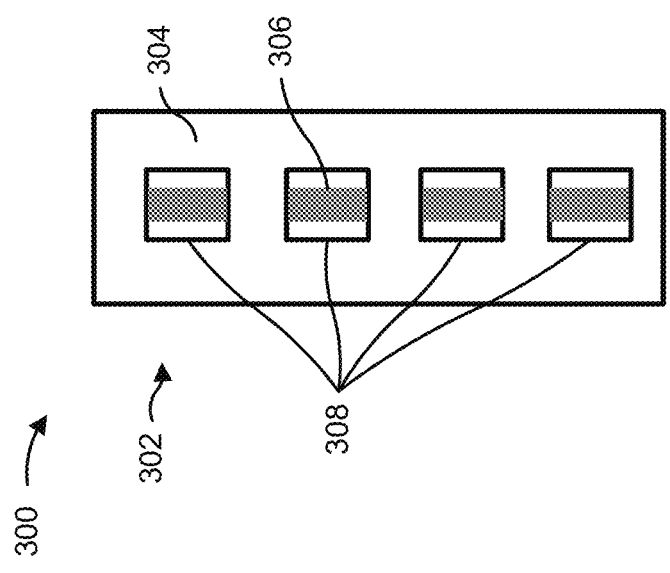
FIGS. 3A-3B are diagrams of an example implementation of a capacitive sensor described herein.
Figure 3A:
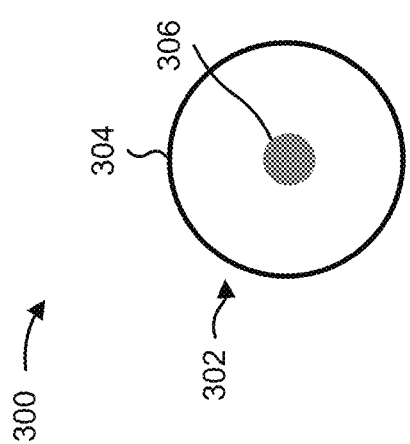

FIGS. 3A-3B are diagrams of an example implementation of a capacitive sensor 300 described herein. In some implementations, the capacitive sensor 122 of FIG. 1 and/or the capacitive sensor 222 of FIG. 2 may be similar to the capacitive sensor 300.

As described with respect to the capacitive sensor 122 of FIG. 1, capacitive sensors may include two elements spaced apart from each other, may generate an electric field between the two elements, and may detect changes to the electric field caused by changes in the capacitance of fluid between the two elements. As shown in FIGS. 3A-3B, the two elements of the capacitive sensor 300 may be a tube 302 having a sidewall 304 and a rod 306 positioned within the tube 302. In some implementations, the tube 302 and the rod 306 may extend vertically in a solvent tank (e.g., the solvent tank 118, the solvent tank 218, and/or the like).

In some implementations, the capacitive sensor 300 may generate an electric field between the tube 302 and the rod 306, and may generate a capacitance signal based on a capacitance of fluid (e.g., liquid, gas, and/or the like) in the electric field between the tube 302 and the rod 306. For example, when the capacitive sensor 300 is in a solvent tank containing solvent and air, a lower portion of the tube 302 will be filled with the solvent and an upper portion of the tube 302 will be filled with air. The capacitive sensor 300 may generate the capacitance signal based on a combined capacitance of the solvent and the air within the tube 302 (e.g., between the sidewall 304 and the rod 306). As a solvent level in the solvent tank increases or decreases, the combined capacitance may change, resulting in a change in the capacitance signal generated by the capacitive sensor 300.

As described herein with respect to FIG. 1, the solvent tank of a fiber cleaning device may become contaminated by water, isopropyl alcohol, and/or other liquids. In some implementations, when water, isopropyl alcohol, and/or other liquids enter the solvent tank, the capacitive sensor 300 may be used to detect the contamination. For example, when water enters the solvent tank and enters the tube 302, the water may change the combined capacitance, resulting in a change in the capacitance signal generated by the capacitive sensor 300. The fiber cleaning device and/or a controller (e.g., the controller 116, the controller 216, and/or the like) may be configured to determine, based on the change in the capacitance signal and known capacitances of air, solvent, water, and/or other liquids, that the solvent tank is contaminated.

In some implementations, however, when water enters the solvent tank, the water may float on top of the solvent due to a higher density of the solvent as compared to water and may not enter the tube 302. Accordingly, in some implementations, and as shown in FIG. 3B, the capacitive sensor 300 may include a tube 302 having openings 308 vertically-spaced (e.g., vertically-spaced openings) in the sidewall 304 such that water floating on top of solvent may enter the tube 302 through the openings 308 (e.g., slots, holes, windows, and/or the like), change the combined capacitance, and change the capacitance signal generated by the capacitive sensor 300.

In some implementations, the vertical spacing of the openings 308 may ensure that, when a contaminating fluid (e.g., water, isopropyl alcohol, and/or other liquids) is in the solvent tank, the contaminating fluid may enter the tube 302 and be detected regardless of the solvent level at a time of contamination. For example, the openings 308 may be positioned in the sidewall 304 such that contaminating fluid may enter the tube 302 at any vertical height along the tube 302.

Although the openings 308 shown in the example implementation of FIG. 3B have a rectangular shape, some implementations may include openings 308 having other shapes (e.g., circular shapes, triangular shapes, and/or the like). Additionally, or alternatively, although each of the openings 308 shown in the example implementation of FIG. 3B have the same shape and/or size, some implementations may include openings 308 having different shapes and/or sizes from each other.

In some implementations, the capacitive sensor 300 may include tubing with a bottom O-ring seal mechanism, where the tubing protects the capacitive sensor 300 from shorting when contaminating fluid (e.g., water, isopropyl alcohol, and/or other liquids) enters the solvent tank. In some implementations, the tubing may be a Teflon tubing, and the O-ring may be formed of a material that expands when exposed to the solvent used in the solvent tank, thereby forming an even tighter seal. For example, the tubing may be polytetrafluoroethylene (PTFE), and the O-ring may be a VITON O-ring.

As indicated above, FIGS. 3A-3B are provided merely as an example. Other examples are contemplated and may differ from what is described with regard to FIGS. 3A-3B.

Figure 4:
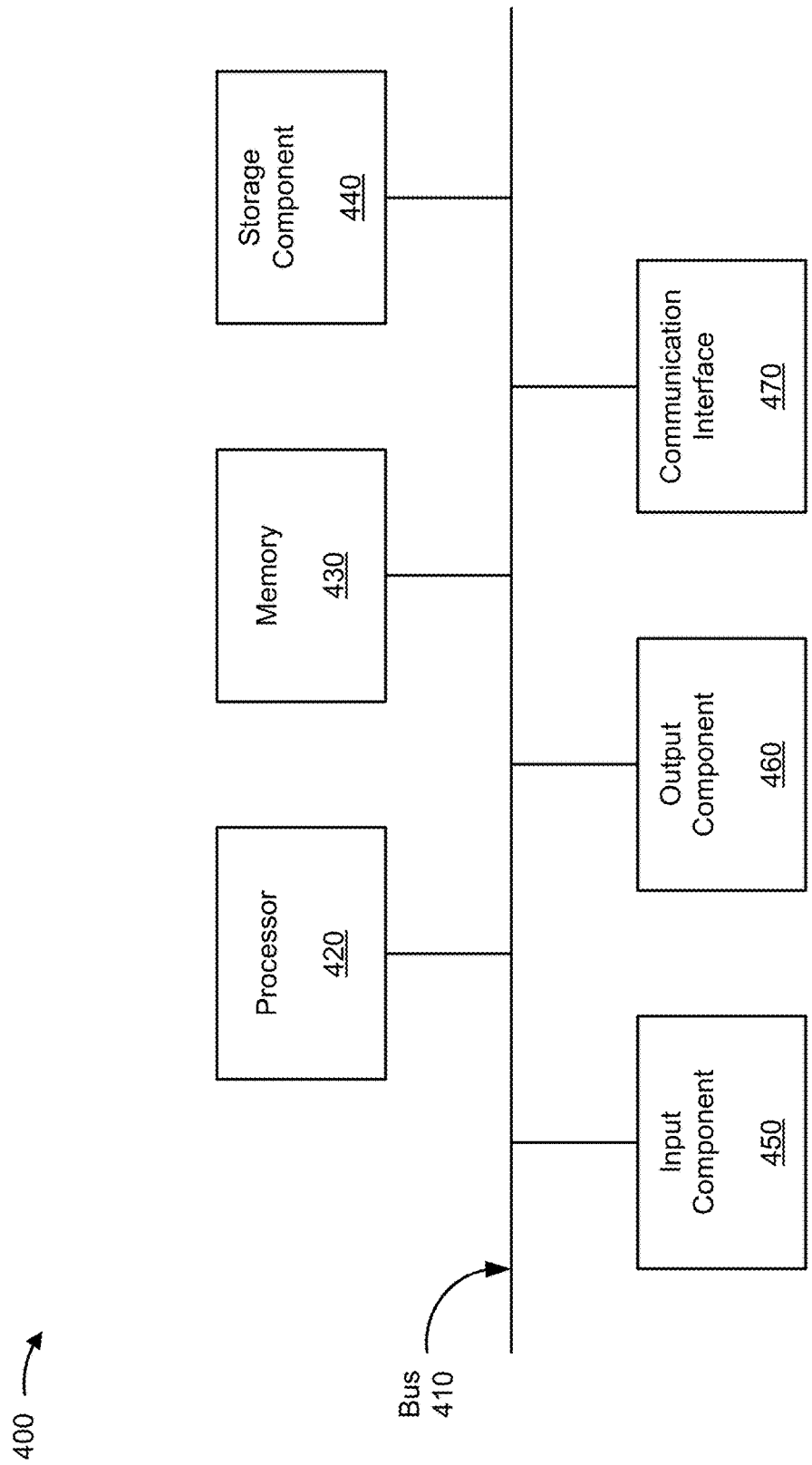
FIG. 4 is a diagram of example components of one or more devices of FIGS. 1-2.

FIG. 4 is a diagram of example components of a device 400. Device 400 may correspond to fiber cleaning device 102 and/or fiber cleaning device 202. In some implementations, fiber cleaning device 102 and/or fiber cleaning device 202 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
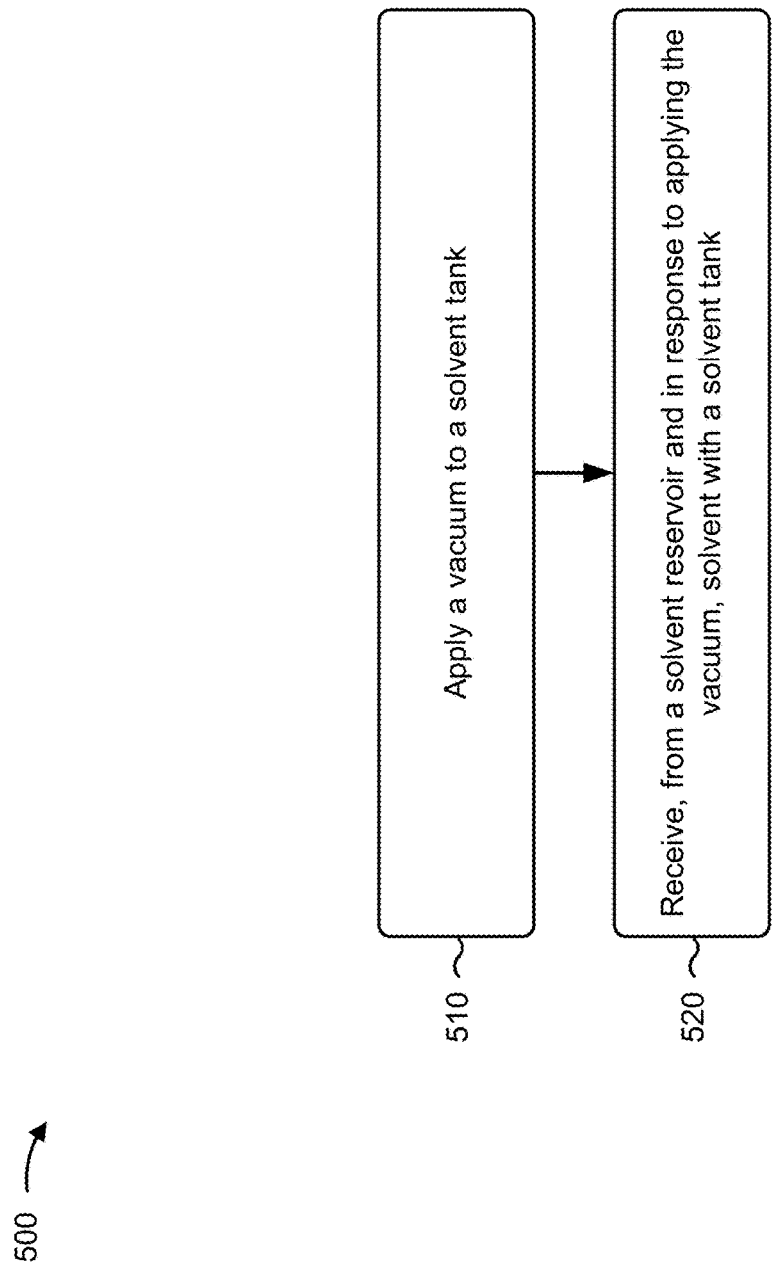
FIGS. 5-6 are flow charts of example processes relating to filling a solvent tank of a fiber cleaning device with solvent from a solvent reservoir.

FIG. 5 is a flow chart of an example process 500 relating to filling a solvent tank of a fiber cleaning device with solvent from a solvent reservoir. In some implementations, one or more process blocks of FIG. 5 may be performed by a device for cleaning an end face of an optical fiber (e.g., fiber cleaning device 102, fiber cleaning device 202, device 400, and/or the like). In some implementations, one or more process blocks of FIG. 5 may be performed by another device or a group of devices separate from or including the device for cleaning an end face of an optical fiber, such as a controller (e.g., the controller 116, the controller 216, and/or the like), a pneumatic circuit (e.g., the pneumatic circuit 104, the pneumatic circuit 204, and/or the like), and/or the like.

As shown in FIG. 5, process 500 may include applying a vacuum to a solvent tank (block 510). For example, the device for cleaning an end face of an optical fiber (e.g., using vacuum generator 106 or 206, processor 420, memory 430, storage component 440, input component 450, output component 460, communication interface 470, and/or the like) may apply a vacuum to a solvent tank, as described above. In some implementations, the device includes a vacuum generator to apply the vacuum and the solvent tank.

As further shown in FIG. 5, process 500 may include receiving, from a solvent reservoir and in response to applying the vacuum, solvent with the solvent tank (block 520). For example, the device (e.g., using solvent tank 118 or 218, and/or the like) may receive, from a solvent reservoir and in response to applying the vacuum, solvent with the solvent tank, as described above.

Process 500 may include additional implementations, such as any single implementation or any combination of implementations described below and/or in connection with one or more other processes described elsewhere herein.

In a first implementation, applying the vacuum to the solvent tank generates a suction to pull solvent from the solvent reservoir.

In a second implementation, alone or in combination with the first implementation, process 500 includes filtering air entering the solvent reservoir, wherein the air is entering the solvent reservoir in response to applying the vacuum to the solvent tank.

In a third implementation, alone or in combination with one or more of the first and second implementations, the device comprises a sensor, and process 500 includes: determining, based on a signal from the sensor, a solvent level in the solvent tank, and performing, based on the solvent level, one or more actions, the one or more actions including: stopping applying the vacuum, displaying the solvent level, and providing at least one of a visual alert or an audible alert.

In a fourth implementation, alone or in combination with one or more of the first through third implementations, the sensor includes at least one of a capacitive sensor or a float sensor.

In a fifth implementation, alone or in combination with one or more of the first through fourth implementations, the device comprises a capacitive sensor, and process 500 includes: determining, when applying the vacuum and based on a signal from the capacitive sensor, a rate of change of capacitance of fluid in the solvent tank, and performing, based on the rate of change of the capacitance of fluid in the solvent tank, one or more actions, the one or more actions including: stopping applying the vacuum, displaying information regarding fluid in the solvent tank, and providing at least one of a visual alert or an audible alert.

In a sixth implementation, alone or in combination with one or more of the first through fifth implementations, the device comprises: a capacitive sensor to generate a capacitance signal based on a capacitance of fluid in the solvent tank, and a float sensor to generate a liquid-level signal based on a level of liquid in the solvent tank, and process 500 includes: determining, based on the capacitance signal and the liquid-level signal, whether the solvent tank is contaminated; and performing, based on determining that the solvent tank is contaminated, one or more actions, the one or more actions including: stopping applying the vacuum, and providing at least one of a visual alert or an audible alert.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
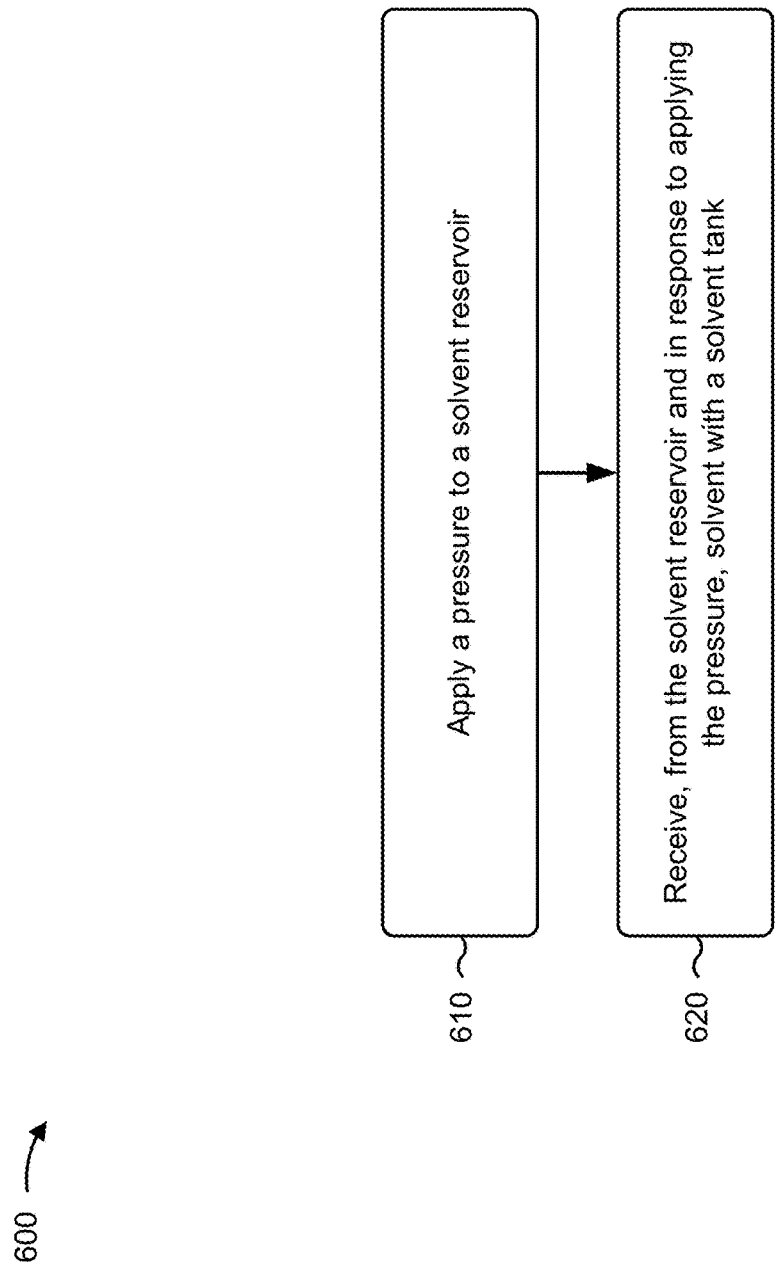

FIG. 6 is a flow chart of an example process 600 relating to filling a solvent tank of a fiber cleaning device with solvent from a solvent reservoir. In some implementations, one or more process blocks of FIG. 6 may be performed by a device for cleaning an end face of an optical fiber (e.g., fiber cleaning device 102, fiber cleaning device 202, device 400, and/or the like). In some implementations, one or more process blocks of FIG. 6 may be performed by another device or a group of devices separate from or including the device for cleaning an end face of an optical fiber, such as a controller (e.g., the controller 116, the controller 216, and/or the like), a pneumatic circuit (e.g., the pneumatic circuit 104, the pneumatic circuit 204, and/or the like), and/or the like.

As shown in FIG. 6, process 600 may include applying a pressure to a solvent reservoir (block 610). For example, the device for cleaning an end face of an optical fiber (e.g., using pressure output port 110 or 210, processor 420, memory 430, storage component 440, input component 450, output component 460, communication interface 470, and/or the like) may apply a pressure to a solvent reservoir, as described above. In some implementations, the device includes a pressure port (e.g., a pressure output port) to apply the pressure and a solvent tank.

As further shown in FIG. 6, process 600 may include receiving, from the solvent reservoir and in response to applying the pressure, solvent with a solvent tank (block 620). For example, the device for cleaning an end face of an optical fiber (e.g., using solvent tank 118 or 218, and/or the like) may receive from the solvent reservoir, and in response to applying the pressure, solvent with a solvent tank, as described above.

Process 600 may include additional implementations, such as any single implementation or any combination of implementations described below and/or in connection with one or more other processes described elsewhere herein.

In a first implementation, applying the pressure to the solvent reservoir generates a positive pressure to push solvent from the solvent reservoir to the solvent tank.

In a second implementation, alone or in combination with the first implementation, the device comprises a sensor, and process 600 includes: determining, based on a signal from the sensor, a solvent level in the solvent tank, and performing, based on the solvent level, one or more actions, the one or more actions including: stopping applying the pressure, displaying the solvent level, and providing at least one of a visual alert or an audible alert.

In a third implementation, alone or in combination with one or more of the first and second implementations, the device comprises a sensor, and process 600 includes: determining, based on a signal from the sensor, a rate of change of a solvent level in the solvent tank, and performing, based on the rate of change of the solvent level, one or more actions, the one or more actions including: stopping applying the pressure, displaying information regarding fluid in the solvent tank, and providing at least one of a visual alert or an audible alert.

In a fourth implementation, alone or in combination with one or more of the first through third implementations, the sensor includes at least one of a capacitive sensor or a float sensor.

In a fifth implementation, alone or in combination with one or more of the first through fourth implementations, the device comprises a capacitive sensor, and process 600 includes: determining, when applying the pressure and based on a signal from the capacitive sensor, a rate of change of capacitance of fluid in the solvent tank, and performing, based on the rate of change of capacitance of fluid in the solvent tank, one or more actions, the one or more actions including: stopping applying the pressure, displaying information regarding fluid in the solvent tank, and providing at least one of a visual alert or an audible alert.

In a sixth implementation, alone or in combination with one or more of the first through fifth implementations, the device comprises: a capacitive sensor to generate a capacitance signal based on a capacitance of fluid in the solvent tank, and a float sensor to generate a liquid-level signal based on a level of liquid in the solvent tank, and process 600 includes: determining, based on the capacitance signal and the liquid-level signal, whether the solvent tank is contaminated; and performing, based on determining that the solvent tank is contaminated, one or more actions, the one or more actions including: stopping applying the pressure, and providing at least one of a visual alert or an audible alert.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   applying, by a device for cleaning an end face of an optical fiber, a vacuum to a solvent tank,
   wherein the device includes:
   a vacuum generator configured to apply the vacuum,
   the solvent tank,
   a capacitive sensor in the solvent tank, and
   a float sensor in the solvent tank;
   receiving, by the device, from a solvent reservoir, and in response to applying the vacuum, solvent with the solvent tank;
   transmitting, by the device and via the capacitive sensor based on a capacitance of liquid in the solvent tank, a capacitance signal;
   transmitting, by the device and via the float sensor based on a level of the liquid in the solvent tank, a liquid-level signal,
   wherein the capacitance signal and the liquid-level signal indicate that the solvent tank is contaminated; and
   performing, by the device and based on the capacitance signal and the liquid-level signal indicating that the solvent tank is contaminated, a set of actions,
   wherein performing the set of actions comprises:
   stopping the vacuum from being applied.

2. The method of claim 1, wherein applying the vacuum to the solvent tank generates a suction to pull solvent from the solvent reservoir.

3. The method of claim 1, further comprising:
   filtering air entering the solvent reservoir,
   wherein the air enters the solvent reservoir in response to applying the vacuum to the solvent tank.

4. The method of claim 1, further comprising:
determining, when applying the vacuum and based on a signal from the capacitive sensor, a rate of change of the capacitance of the liquid in the solvent tank, and
stopping, based on the rate of change the vacuum from being applied.

5. The method of claim 1, further comprising:
determining, based on a signal from the float sensor, a rate of change of the level of the liquid in the solvent tank, and
stopping, based on the rate of change, the vacuum from being applied.

6. The method of claim 1, further comprising:
determining, based on a signal from the capacitive sensor, a change of a type of the liquid in the solvent tank, and
stopping, based on the change, the vacuum from being applied.

7. A method, comprising:
applying, by a device for cleaning an end face of an optical fiber, a pressure to a solvent reservoir,
wherein the device includes:
a pressure port configured to apply the pressure,
a solvent tank,
a capacitive sensor in the solvent tank, and
a float sensor in the solvent tank;
receiving, by the device, from the solvent reservoir, and in response to applying the pressure, solvent with the solvent tank;
transmitting, by the device and via the capacitive sensor based on a capacitance of liquid in the solvent tank, a capacitance signal;
transmitting, by the device and via the float sensor based on a level of the liquid in the solvent tank, a liquid-level signal,
wherein the capacitance signal and the liquid-level signal indicate that the solvent tank is contaminated; and
performing, by the device and based on the capacitance signal and the liquid-level signal indicating that the solvent tank is contaminated, a set of actions,
wherein performing the set of actions comprises:
stopping the pressure from being applied.

8. The method of claim 7, wherein applying the pressure to the solvent reservoir generates a positive pressure to push solvent from the solvent reservoir to the solvent tank.

9. The method of claim 7, further comprising:
determining, based on a signal from the float sensor, a rate of change of the level of the liquid in the solvent tank, and
stopping, based on the rate of change, the pressure from being applied.

10. The method of claim 7, further comprising:
determining, when applying the pressure and based on a signal from the capacitive sensor, a rate of change of the capacitance of the liquid in the solvent tank, and
stopping, based on the rate of change the pressure from being applied.

11. The method of claim 7, further comprising:
filtering air entering the solvent reservoir,
wherein the air enters the solvent reservoir in response to applying the pressure to the solvent tank.

12. A device for cleaning an end face of an optical fiber, comprising:
a vacuum generator configured to apply a vacuum for cleaning the end face;
a solvent tank configured to receive solvent from a solvent reservoir in response to the vacuum being applied;
a float sensor in the solvent tank configured to transmit a liquid-level signal;
a capacitive sensor in the solvent tank configured to transmit a capacitance signal,
wherein the capacitance signal and the liquid-level signal indicate that the solvent tank is contaminated; and
one or more processors configured to:
determine, based on the capacitance signal and the liquid-level signal, that the solvent tank is contaminated, and
perform, based on
determining that the solvent tank is contaminated, a set of actions,
wherein the one or more processors, to perform the set of actions, are configured to:
stop the vacuum from being applied to the solvent tank, or
stop pressurized air from being applied to the solvent reservoir.

13. The device of claim 12, wherein the float sensor is configured to sense a solvent level in the solvent tank.

14. The device of claim 12, wherein the capacitive sensor is further configured to sense a capacitance of liquid in the solvent tank.

15. The device of claim 14, wherein the one or more processors are configured to:
determine, based on the capacitance, a rate of change of the capacitance; and
determine, based on the rate of change, whether the solvent tank is contaminated.

16. The device of claim 12, wherein the float sensor is configured to generate the liquid-level signal based on a level of liquid in the solvent tank.

17. The device of claim 12, wherein the capacitive sensor comprises:
a tube extending vertically in the solvent tank,
wherein the tube includes vertically-spaced openings; and
a rod extending vertically in the solvent tank,
wherein the rod is positioned within the tube.

18. The device of claim 12, wherein the capacitive sensor is further configured to detect a chance change in a type of fluid in the solvent tank.

19. The device of claim 12, further comprising:
an air filter configured to filter air entering the solvent reservoir,
wherein the air enters the solvent reservoir in response to the vacuum being applied to the solvent tank.

20. The device of claim 12, wherein the one or more processors are further configured to:
determine, based on a signal from the float sensor, a rate of change of the level of the liquid in the solvent tank, and
stop, based on the rate of change, the vacuum from being applied.

* * * * *